३,०६५,७४३

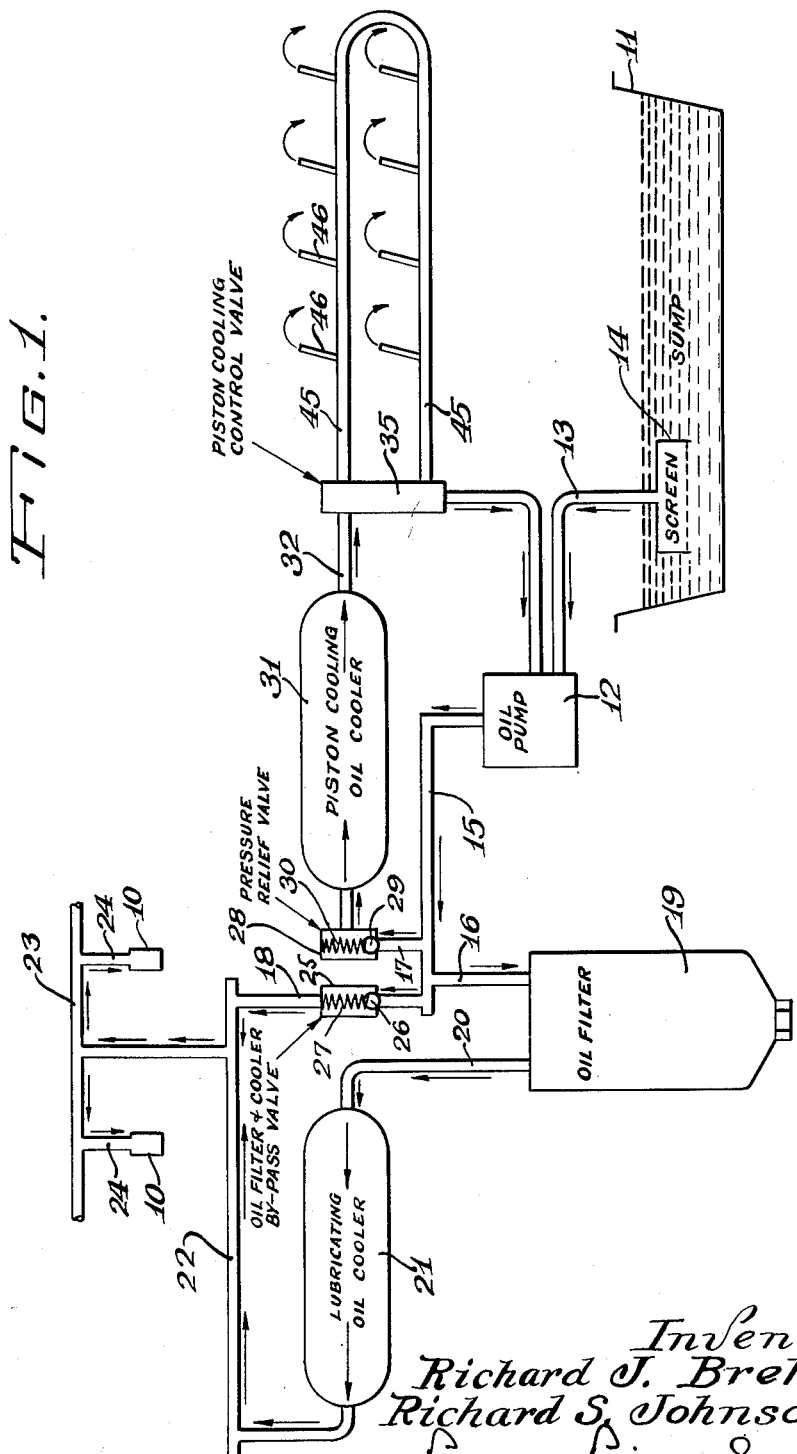

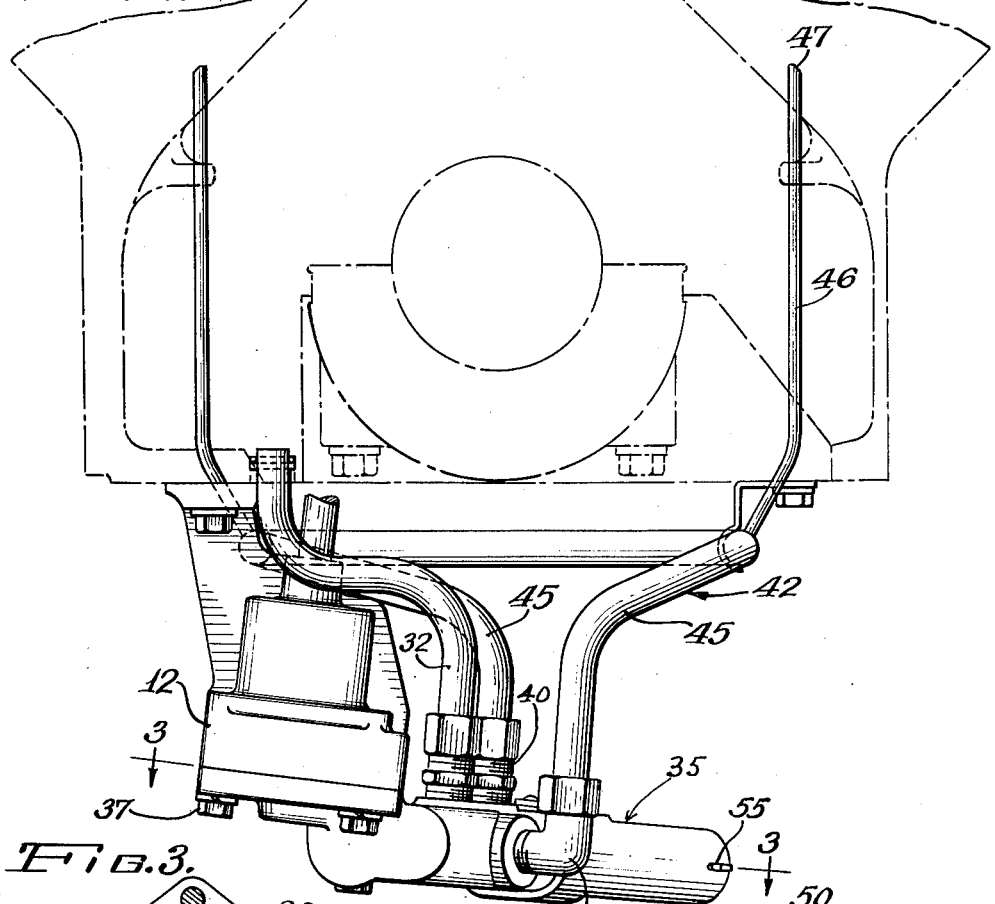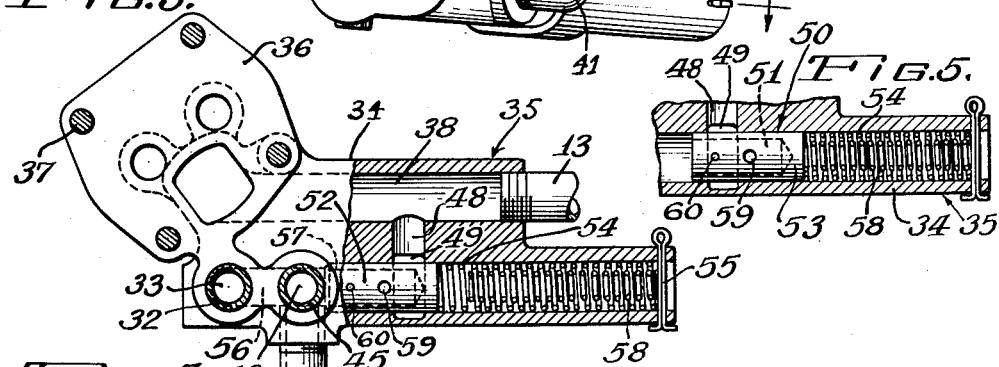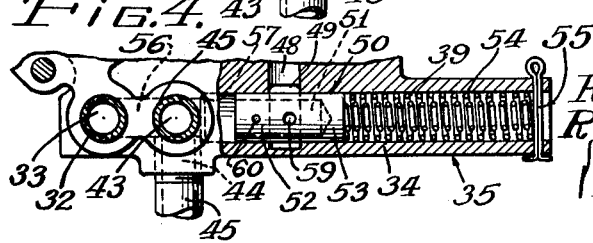

United States Patent Office 3,065,743
Patented Nov. 27, 1962

1

3,065,743
INTERNAL COMBUSTION ENGINE LUBRICATING SYSTEM AND TEMPERATURE REGULATING MEANS FOR THE PISTONS THEREOF
Richard J. Brehm and Richard S. Johnson, Fort Wayne, Ind., assignors to International Harvester Company, Chicago, Ill., a corporation of New Jersey
Filed Feb. 9, 1961, Ser. No. 88,118
13 Claims. (Cl. 123—41.08)

This invention relates to reciprocating piston type internal combustion engine lubricating systems and temperature regulating means for the pistons thereof, and more particularly to a system for lubricating the bearings and other relatively movable machine parts of an internal combustion engine requiring lubrication and to incorporate in the lubrication system novel means for regulating the temperature of the engine pistons under all conditions of operation.

The lubricating systems of many internal combustion engines especially those used in the so-called "heavy-duty type" of motor truck usually include lubricant conditioning or treating means, such as an oil filter or the like and an oil cooler, which is generally arranged in the lubricant circulating system between an engine driven pressure producing lubricating pump and the bearings and other working or relatively movable parts of the engine requiring lubrication. The lubricating systems are usually provided with a bypass or shunt line around the oil filter and cooler, which are generally arranged in series, to insure an adequate flow of lubricant to the various points in the engine requiring the lubrication even though the filter and/or oil cooler should become clogged. The lubricating systems are also provided with a pressure regulating or main relief valve which is operable to control the maximum lubricant pressure permitted in the system. The flow through the bypass line is controlled by a valve responsive to the difference in pressure existing at the inlet and outlet sides of the oil conditioning means. Obviously, the pressure of the lubricant on the inlet side of the lubricant conditioning means must be greater than on the discharge or outlet side thereof to insure flow of lubricant through the lubricant conditioning means but the pressure drop through the lubricant conditioning means must not be so excessive that the lubricant pressure on the outlet side thereof is inadequate to provide the proper flow of lubricant to the various bearings and other working parts of the engine. Thus, the pressure of the lubricant at the outlet side of the lubricant conditioning means is critical and, hence, the main pressure relief or regulating valve is oftentimes placed in the lubricant circulating system between the oil conditioning means and the main oil gallery which is in fluid communication with the bearings and other parts requiring lubrication. As a result, with this type of arrangement and under certain operating conditions of the engine as when the engine is first started in extremely cold weather, excessively high damaging pressures are sometimes developed in the lubricant conditioning means which are well above the desired predetermined maximum oil pressure before the main regulating valve would open to relieve the high pressures. To obviate this disadvantage of many engine lubricating systems, the present invention contemplated locating the main pressure or regulating valve intermediate the discharge side of the lubricating pump and the lubricant conditioning means. Thus, the maximum pressure permitted in the oil conditioning means is limited to that established by the setting of the main pressure relief valve and, consequently, the oil conditioning means is never subjected to abnormally high pressures.

It is, therefore, an important object of the present invention to provide a pressure lubricating system for internal combustion engines in which the lubricant pressure in the main oil gallery is maintained substantially constant and the maximum lubricant pressure developed by the pump is controlled by a main pressure relief valve interposed between the discharge of the pump and the oil treating means.

It has been found desirable in the operation of certain types of internal combustion engines to maintain the piston temperature within a certain range. It is well established that when an engine is running under partial or full load, a greater cooling effort is required than when the engine is lightly loaded or is idling. In fact, in order to maintain a relatively high piston temperature when the engine is idling, very little, if any, cooling of the pistons is desired or required. Cooling of the pistons is generally accomplished by directing a coolant such as a jet of lubricating oil against the underside of the piston head. In most installations, the lubricant is directed toward the interior of each of the pistons by means of a nozzle which nozzle is connected to the lubricating system of the engine. Heretofore, the nozzle for each piston was connected to the engine pressure lubricating system on the discharge side of the oil treating means. Consequently, not only the oil required for lubricating the bearings passed through the oil filter, but also that lubricating oil emitted from the nozzles as a piston coolant also passed through the oil filter. It has been proven that for a new engine, only a little more than half of the total oil pumped actually is needed to lubricate the engine bearings. Furthermore, filtered oil is not required for piston cooling. Thus in prior pressure lubricating systems incorporating piston cooling means, the oil filter capacity had to be considerably greater and more costly than actually needed to supply the bearings with filtered lubricant. Furthermore, the filter element life for a given level of oil contamination is needlessly shortened by circulating the piston cooling oil through the oil filter. The present invention contemplates utilizing a separate lubricant cooler solely for piston cooling and to supply the piston oil cooler with oil from the inlet side of the oil filter.

As stated hereinbefore the degree of piston cooling required is dependent upon the heat and load conditions encountered by the vehicle engine which conditions are variable. Heretofore no practical and efficient means are devised for automatically adjusting the cooling effort to the variable heat and load conditions encountered by the engine. Such prior means either were so costly and complex so as to be impractical or failed to regulate the piston temperature in an extremely inefficient manner. In certain prior systems the lubricating oil for cooling the pistons was branched from the main oil gallery and and the piston cooling flow control valve always operated at the same pressure which pressure generally was the maximum pressure maintained in the lubricating oil circulating system. It is obvious that since the primary purpose of an engine lubricating system is to insure sufficient lubrication of the bearings at all times and such assurance is dependent upon the pressure of the lubricant in the main oil gallery of the engine, oftentimes inadequate lubrication of the bearings resulted in systems where the pressure in the main oil gallery was influenced by shunting lubricating oil for piston cooling from the main oil gallery. It is therefore another important object of the present invention to provide a piston cooling control valve which is inoperative until some lubricant flows through the main pressure relief valve and the proper pressure is present in the main oil gallery to insure efficient lubrication of the engine barings. Once the proper pressure in the main oil gallery is reached the piston control valve becomes operable to regulate the temperature of the pistons by increasing the quantity of lubricating oil and thus the cooling effort is increased as the engine speed increases and to accomplish the temeprature regulation of the engine bearings.

The present invention contemplates arranging the main pressure relief valve in relation to the piston cooling control valve in such a manner that all of the lubricating oil delivered from the oil pump is directed to the engine bearings and none of it flows to the cooling jets or nozzles until a full gallery lubricant pressure is developed in the engine.

Another object of the present inventoin is to provide an engine lubricating and piston temperature regulating system wherein foam formation is inhibited. It is well known that lubricating oil foam formation if permitted to exist in an engine for any length of time will result in improper lubrication of the engine bearings and/or rapid deterioration of the lubricating oil. Foaming of the lubricating oil is partially caused by the mixing of air and oil by the pump in withdrawing the lubricant from the oil sump when any portion of the pump inlet conduit is open to the atmosphere. In many prior lubricating systems incorporating piston temperature regulating means, air can be drawn through the oil ejecting nozzles under certain operating conditions of the engine. The present invention contemplates the reduction of lubricating oil foam formation by directing the excess lubricant not required for piston cooling to flow directly back to the suction side of the oil pump rather than by way of the oil sump. The excess oil flowing from the main pressure relief valve and not required for piston cooling passes through the piston temperature control valve and flows directly to the suction side of the oil pump. The piston temperature control valve has a check valve means incorporated therein to keep air from being sucked into the oil pump through the piston cooling nozzles just after the engine is started and before lubricant is flowing through the main pressure relief valve.

The foregoing and other important objects and desirable features inherent in and encompassed by the invention together with many of the purposes and uses thereof will become readily apparent from the reading of the ensuing description in conjunction with the annexed drawing, in which:

FIGURE 1 is a diagrammatic view of an engine lubricating and piston temperature regulating system incorporating the invention;

FIGURE 2 is a side elevational view of the piston temperature regulating valve;

FIGURE 3 is a sectional view taken substantially along line 3—3 of FIGURE 2 showing the positions of various parts of the valve with respect to each other when the engine is first started;

FIGURE 4 is a view similar to FIGURE 3 illustrating the positions of the various parts of the piston temperature regulating valve after full oil gallery pressure has been reached and the valve is conditioned to permit cooling oil to flow from the piston cooling nozzle; and FIGURE 5 is a view similar to FIGURE 4 with the exception that the various parts of the valve are in the positions assumed thereby when maximum cooling of the pistons is required.

Referring to the drawings in detail wherein like reference characters represent like elements throughout the various views, the bearings 10 of an internal combustion engine are shown diagrammatically.

The engine lubricating system for supplying the bearings 10 with lubricant includes a sump reservoir 11 formed in the bottom of the engine crank case which is adapted to collect lubricant draining from the engine bearings and other working parts of the engine supplied with lubricant and from the cooling nozzles as will be pointed out hereinafter.

The pressure lubricating system for supplying the bearings 10 with lubricant under pressure includes an engine driven pump 12. A pipe or line 13 leads from the inlet or suction side of the pump 12 to a point adjacent the bottom of the crank case sump 11. The end of the pipe 13 disposed within the sump 11 is provided with a filtering screen 14 which is disposed below the normal operating level of the oil contained within the sump 11. A discharge line or pipe 15 extends from the pressure side of the pump 12. Extending from the discharge pipe 15 are an oil filter supply line 16, a pressure relief line 17 and an oil filter and cooler bypass line 18. The oil filter supply line provides fluid communication between the pump discharge pipe 15 and the inlet of an oil filter 19 of conventional design. Connected in series with the oil filter 19 by means of a pipe 20 is a lubricating oil cooler 21 of conventional design. A pipe 22 leading from the outlet of the oil cooler 21 is in fluid communication with a main oil gallery 23 which in turn supplies the bearings 10 with lubricant under pressure through branch conduits 24. The oil filter and bypass line 18 extends between the pump discharge pipe 15 and the outlet pipe 22 from the oil cooler 21. Interposed in the bypass line 18 is a conventional spring-pressed bypass valve for controlling the flow of oil through the bypass line 18. As in conventional bypass valves, valve 25 contains a ball 26 normally held upon its seat by a spring 27. In lieu of a ball, a plunger could be employed. When the oil flowing through the oil filter and cooler is unduly restricted the ball 26 will be moved off of its seat so as to permit lubricating oil to pass directly from the discharge pipe 15 to the oil gallery 23. The valve 25 is operated by differential pressure in the pipes 15 and 23 and the spring 27 which controls the differential range of pressure at which the valve will open and close. Thus when the pressure difference in main oil gallery 23 and the discharge pipe 15 exceeds a predetermined value the spring 27 is compressed and the ball 26 is unseated to permit bypassing of the oil filter 19 and oil cooler 21.

In order to insure the maintenance of a substantially constant oil pressure in the main oil gallery 23 whereby the bearings 10 and other working parts (not shown) of the engine in fluid communication with the main oil gallery 23 will receive sufficient lubrication under all operating condition of the engine the inlet of the main pressure relief valve 28 is placed in fluid communication with the pump discharge pipe 15 by way of the line 17 rather than with the main oil gallery 23 as in the usual engine pressure lubricating system. The main pressure relief valve 28 contains a ball 29 which is urged upon its seat by a compression spring 30. The main pressure relief valve 28 opens at a predetermined pressure to define the maximum oil pressure permitted in the pump discharge pipe 15 and only opens when the pressure in the main oil gallery 23 exceeds the desired maximum pressure necessary for providing the bearings 10 and other working parts of the engine with the proper flow of lubricating oil. From the foregoing it will be appreciated that in the lubricating system thus far described the maximum pressure permitted in the oil filter 19 and the oil cooler 21 is limited to that established by the setting of the main pressure relief valve 28 and consequently the oil filter and cooler are never subjected to abnormally high pressures. Furthermore, the lubricant pressure is maintained substantially constant and at the desired value in the main oil gallery 23 to insure proper lubrication of the bearings 10 and other working parts of the engine under all operating conditions of the engine.

As stated hereinbefore it is an object of the invention to provide a lubricating system having means for regulating the temperature of the pistons incorporated therein. The piston temperature regulating means of the lubricating system includes an oil cooler 31 which is separate and distinct from the oil cooler 21 employed to cool the lubricant directed to the engine bearings 10 and other working parts of the engine and is used solely for cooling the lubricating oil used for controlling the temperature of the engine pistons. The inlet to the oil cooler 31 is placed in fluid communication with the main pressure relief valve 28. Thus the piston cooling oil cooler 31 is not supplied with lubricant until the main pressure relief valve 28 opens which condition of the main pressure relief valve only occurs when the pressure in the main oil gallery 23 has reached the desired predetermined value necessary for insuring the proper flow of lubricant to the bearings 10 and other working parts of the engine. Thus the primary function of an engine lubricating system to insure sufficient lubrication of the bearings and other working parts of the engine at all times and under all working operating conditions of the engine is achieved. It will also be appreciated that the oil entering the piston cooling oil cooler 31 is unfiltered inasmuch as filtered oil is not required for piston cooling. Consequently only the oil flowing to the engine bearings 10 and other working parts of the engine which must be filtered passes through the oil filter 19 and the oil cooler 21 thereby limiting the oil flow through the oil filter 19 to the minimum amount required for properly lubricating the engine bearings 10 and other working parts of the engine. The significance of this feature of the lubricating system of the present invention becomes apparent when it is realized that only a little more than one-half of the total oil pumped by the oil pump of a new engine actually flows to the main oil gallery. Thus if all of the oil delivered by the pump 12 passed through the oil filter 19 and the oil cooler 21, the pressure drop through the oil filter 21 for a given amount of dirt would be four times that which would be encountered in the lubricating system of the present invention. Obviously the filter element life for a given level of oil contamination is extended considerably to thereby lower engine maintenance cost. Furthermore, since the oil filter 19 and the oil cooler 21 are not required to handle the oil utilized for cooling the pistons as well as for lubricating the bearings and other working parts of the engine, the oil filter 19 and the oil cooler 21 may have a considerably smaller oil handling capacity to thereby lower the initial cost of the engine. Unfiltered cooled oil emitted from the piston cooling oil cooler 31 flows through a pipe 32 which has one end connected to an inlet port 33 formed in the casing 34 of a piston cooling control valve designated generally by numeral 35 as best shown in FIGURES 2 and 3. One end of the valve casing 34 is provided with a relatively flat attachment pad 36 which is adapted to be fastened to the bottom of the oil sump 12 by means of a plurality of machine screws 37. The valve casing 34 is provided with a pair of spaced and substantially parallel bores 38, 39 which extend longitudinally therethrough. One end of the pump inlet pipe 13 is connected to one end of the bore 38 as illustrated in FIGURE 3 and the opposite end of the bore 38 is in fluid communication with the pump inlet. The inlet port 33 of the valve casing 34 is in fluid communication with one end of the bore 39. The ends 40, 41 of a piston cooling harness or manifold 42 are also connected to ports 43, 44 formed in the valve casing 34 and in fluid communication with the bore 39 adjacent the inlet port 33. The piston cooling oil manifold or harness 42 may be in the form of a pre-fabricated assembly which includes a tube which is attached to the engine crank case as shown in FIGURE 2 by means of brackets or it could be built into the crank case casting by machining the proper channels therein without departing from the spirit and scope of the invention. Extending from the tube 45 are a plurality of branch lines or tubes 46. While two tubes 46 are shown in FIGURE 2 it is to be understood that there is a tube 46 for each of the engine pistons as shown in FIGURE 1. The tubes 46 extend generally vertically from the tube 45 and the free end of each tube 46 is provided with a cooling oil ejecting nozzle 47 which is disposed at the lower end of a respective cylinder bore formed in the crank case. Each of the nozzles 47 is provided with a restricted opening which is oriented in such a manner that under certain operating conditions of the engine jets of oil are emitted from the nozzle 47 and the oil jets are caused to impinge or spray the interior of the engine pistons to cool the pistons and to lubricate the engine cylinders.

A cross passage 48 extending between mid-portions of the bores 38 and 39 is used to provide fluid communication between the bores. One end of the cross passage 48 opens directly into the bore 38 while the opposite end thereof opens into an annular groove 49 formed in the cylindrical surface of the valve casing 34 defining the bore 39. A cylindrical valve element 50 is slidably mounted within the bore 39 and is adapted to slide along the longitudinal axis of the bore 39 in a manner which will be pointed out hereinafter to control the flow of lubricating oil to the nozzles 47 and the inlet side of the oil pump 12. The valve element 50 has a central recess 51 extending longitudinally from one end face thereof to define a tubular wall portion 52 and a closed end 53. A helically wound compression spring 54 disposed within the bore 39 has one end reacting against the closed end 53 of the valve element 50 and its opposite end bearing against a spring retainer 55 which is in the form of a pin. The spring retainer 55 extends across the open end of the bore 39 as best shown in FIGURE 3. As best shown in FIGURES 3 and 4 the ports 43 and 44 open into a bore 56 which is in axial alignment with but of a smaller diameter than the bore 39 whereby an annular shoulder 57 is formed at the juncture of the bores 56 and 39. The annular shoulder 57 serves as an abutment for limiting sliding movement of the valve element 50 with respect to the valve casing 34 in one direction and the length of the spring 54 is such that open end of the valve element 50 is resiliently urged against the annular shoulder 57 when the engine is not in operation.

With the recessed end of the valve element 50 abutting the annular shoulder 57, the control valve 35 is in its closed condition and the bore 38 is isolated from the bore 39, as shown in FIGURE 3. A second helically wound compression spring 58 of shorter length but having a greater spring rate than the spring 54 is also disposed within the bore 39 and like the spring 54 has one end abutting the cotter pin or spring retainer 55. The spring 58 does not react upon the valve element 50 until the valve element 50 is moved from the position shown in FIGURE 3 to the position shown in FIGURE 4 where one end of the spring 58 commences to engage the closed end 53 of the valve element 50. It will be noted, the tubular wall portion 52 of the valve element has a pair of axially spaced series of circumferentially spaced ports 59 and 60 therethrough. Only one port of each series of ports 59 and 60 is shown in the drawing. The total cross sectional area of the ports 59 is considerably greater than the total cross sectional area of the ports 60 and the ports 59 are axially spaced closer to the closed end 53 of the valve element 50 than the ports 60. When the valve element is in the position shown in FIGURE 4 corresponding to the first open position of the valve element 50, the large ports 59 are in radial alignment with the annular groove 49 and fluid communication is established between the bores 38 and 39 or between the inlet side of the pump 12 and the bore 39. The valve element 50 is capable of moving to a second open position, as illustrated in FIGURE 5, wherein the small ports 60 are in radial alignment with the annular groove 49 and the large ports 59 are moved out of radial alignment with the annular groove 49. It will be appreciated that in order for the valve element 50 to move to the position illustrated in FIGURE 5 it is necessary to compress both of the springs 54 and 58. The manner in which the valve element 50 is moved against the biasing action of the springs 54 and 58 will be pointed out hereinafter.

In operation, assuming the engine is at rest or not operating, the valve element 50 is maintained in its closed position, illustrated in FIGURE 3, by the resilient action of the compression spring 54. Once the engine is initially started, the oil pump 12 commences to deliver lubricant under pressure to the discharge pipe 15 and simultaneously oil is drawn through the inlet pipe 13 from the oil sump 11. Inasmuch as the valve element 50 is in its closed position and the bore 38, which is in fluid communication with the inlet of the pump 12 and the inlet pipe 13, is isolated from the bore 39, air is kept from being sucked into the oil pump 12 through the piston cooling oil ejecting nozzle openings. All of the oil drawn into the pump 12 comes directly from the sump 11 during this operational phase of the engine. Consequently the possibility of mixing the oil with air and forming foam in the lubricating system is reduced. The lubricant under pressure in the discharge pipe 15 flows through the oil filter 19 and oil cooler 21 to the main oil gallery 23 where it is distributed to the engine bearing 10 and other working parts of the engine requiring lubrication. Inasmuch as all of the oil utilized for piston cooling must of necessity pass through the pressure relief valve 28 and since the pressure relief valve 28 will not open until the desired lubricant pressure in the main oil gallery 23 is reached, the fact that pistoin temperature regulating means is incorporated in the lubricating system, in no way adversely affects proper lubrication of the engine. Assuming that the engine is running at idling speed or under light load conditions and full oil gallery pressure has been established in the main oil gallery 23, the pressure relief valve ball 29 moves off of its seat against the biasing action of spring 30 permitting oil to commence flowing into the piston cooling oil cooler 31. The open end of the valve element 50 remains seated on the annular shoulder 57 until any air in the piston temperature regulating portion of the lubricating system is displaced and caused to be emitted from the nozzle openings. The total cross sectional area of the nozzle openings is considerably less than the diameter of the recess 51 and once the system is purged of air and as soon as oil pressure exists in the bore 56, the valve element 50 moves from the position shown in FIGURE 3 to the position shown in FIGURE 4 against the biasing action of the compression spring 54. As stated hereinbefore, when the valve element 50 is in this position, the large ports 59 are in radial alignment with the annular groove 49 and consequently fluid communication is established between the bores 38 and 39. The cross sectional area of the large ports 59 is considerably greater than the total cross sectional area of the nozzle openings and at low engine speeds substantially all of the oil flowing from the piston cooling oil cooler 31 to the control valve 35 flows to the bore 38 and the inlet or suction side of the pump 12 and no lubricating oil is emitted by the nozzles 47. Inasmuch as the quantity of oil flowing to the control valve 35 is dependent upon the difference between the amount of oil required to lubricate the bearings 10 and other working parts of the engine and the total output of the pump 12, the quantity of oil and thus the pressure of the oil delivered to the bore 56 increases with engine speed. At a predetermined critical engine speed which engine speed is established by the quantity of oil flowing through the main pressure relief valve 28, the pressure drop through the large ports 59 rises sufficiently to cause the valve element 50 to commence moving the valve element 50 to the right, as viewed in FIG. 4, against the biasing action of both springs 54 and 58. When this occurs, the large ports 59 are moved out of radial alignment with the annular groove 49. As the large ports 59 start to move out of radial alignment with the annular groove 49 and commence to be covered the oil pressure in the inlet bore 56 increases rapidly and as a result the valve element 50 moves rapidly from the position shown in FIGURE 4 to the position shown in FIGURE 5 wherein the small ports 60 are in radial alignment with the annular groove 49. When this occurs the pressure drop across the nozzle openings rises sharply and oil commences to flow therefrom to cool the pistons.

Form the foregoing it will be appreciated that the quantity of oil which flows through the main pressure relief valve 28 is the difference between the quantity required for lubricating the engine bearings 10 and other working parts of the engine and the quantity of lubricant delivered by the pump 12 and the quantity of oil which flows through the main pressure relief valve 28 either returns to the inlet of the pump 12 directly through the piston cooling control valve 35 and thereby bypassing the sump 11 or by way of the sump 11 after being emitted from the oil ejecting nozzles 47. By properly spacing the ports 59 and 60 and by varying the cross sectional area of the ports the quantity of oil and the pressure thereof ejected from the nozzle opening for cooling the pistons as well as the engine speed at which cooling of the piston commences may be varied as desired.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. In an internal combustion engine having a plurality of pistons, the combination comprising, an engine-driven oil circulating pump; a supply line in fluid communication with the pressure discharge side of said pump; a main oil gallery in fluid communication with various parts of the engine requiring lubrication; conduit means extending between and connected to said main oil gallery and supply line to provide fluid communication therebetween; a pressure relief line extending between and connected to said supply line and the suction side of said pump to provide fluid communication therebetween; a plurality of oil ejecting nozzles adapted to cool the pistons by oil jets emerging therefrom, said nozzles being in fluid communication with said pressure relief line; a single valve in said pressure relief line between said nozzles and said supply line, said valve being biased to its closed condition, said valve being responsive to the oil pressure in said supply line to open when the oil pressure in said supply line reaches a predetermined magnitude.

2. In an internal combustion engine substantially as set forth in claim 1, wherein said conduit means includes an oil filer and an oil cooler arranged in series, and a second oil cooler in said pressure relief line between said valve and said nozzles.

3. In an internal combustion engine having a plurality of pistons, the combination comprising, a supply line adapted to receive oil under pressure when the engine is in operation; a main oil gallery in fluid communication with various parts of the engine requiring lubrication; oil conditioning means including an oil filter in fluid communication with said main oil gallery and said supply line; a plurality of oil ejecting nozzles adapted to cool the pistons by oil jets emerging therefrom; a pressure relief line in fluid communication with said oil ejecting nozzles and said supply line; oil cooling means in said pressure relief line; and a single valve in said pressure relief line between said supply line and said oil cooling means, said valve being biased to its closed condition, said valve being responsive to the oil pressure in said supply line to open when the oil pressure in said supply line reaches a predetermined magnitude.

4. In an internal combustion engine having a plurality of pistons, the combination comprising, a supply line adapted to receive oil under pressure when the engine is in operation; a main oil gallery in fluid communication with various parts of the engine requiring lubrication; oil conditioning means including an oil filter and an oil cooler arranged in series and in fluid communication with said main oil gallery and said supply line; a bypass line in fluid communication with said main oil gallery at one end of said oil conditioning means and said supply line at the opposite end of said oil conditioning means; a valve in said bypass line, said valve being biased to its closed condition, said valve being responsive to the difference in oil pressure in said supply line and said main oil gallery and being adapted to open when the difference in oil pressure reaches a predetermined magnitude; a plurality of oil ejecting nozzles adapted to cool the pistons by oil jets emerging therefrom; a pressure relief line in fluid communication with said nozzles and said supply line; a second oil cooler in said relief line; and a valve in said pressure relief line between said second oil cooler and said supply line, said valve being biased to its closed condition, said valve being responsive to the oil pressure in said supply line to open when the oil pressure in said supply line reaches a predetermined magnitude.

5. In an internal combustion engine having a plurality of pistons, the combination comprising, an engine-driven oil circulating pump; a supply line in fluid communication with the pressure discharge side of said pump; a main oil gallery in fluid communication with various parts of the engine requiring lubrication; conduit means extending between and connected to said main oil gallery and supply line to provide fluid communication therebetween; a pressure relief line extending between and connected to said supply line and the suction side of said pump to provide fluid communication therebetween; a valve in said pressure relief line, said valve being biased to its closed condition, said valve being responsive to the oil pressure in said supply line to open when the oil pressure in said supply line reaches a predetermined magnitude; a second valve in said pressure relief line between said first mentioned valve and the suction side of said pump, said second valve being biased to its closed condition, said second valve being responsive to the oil pressure in said pressure relief line to open when the oil pressure in said pressure relief line reaches a predetermined magnitude; a plurality of oil ejecting nozzles adapted to cool the pistons by oil jets emerging therefrom; and means providing fluid communication between said nozzles and said pressure relief line intermediate said valves.

6. In an internal combustion engine substantially as set forth in claim 5, wherein said conduit means includes an oil filter and oil cooler arranged in series, and further includes a second oil cooler in said pressure relief line intermediate said first valve and said means providing fluid communication between said nozzles and said pressure relief line.

7. In an internal combustion engine substantially as set forth in claim 6, wherein said means providing fluid communication between said nozzles and pressure supply line includes a second conduit means extending between and connected to said nozzles and said pressure relief line intermediate said valves.

8. In an internal combustion engine having a plurality of pistons, the combination comprising, an engine-driven oil circulating pump; a supply line in fluid communication with the pressure discharge side of said pump; a main oil gallery in fluid communication with various parts of the engine requiring lubrication and said supply line; a pressure relief line extending between and connected to said supply line and the suction side of said pump to provide fluid communication therebetween; a valve in said pressure relief line, said valve being biased to its closed condition, said valve being responsive to the oil pressure in said supply line to open when the oil pressure in said supply line reaches a predetermined magnitude; a second valve in said pressure relief line between said first mentioned valve and the suction side of said pump, said second valve being biased to its closed condition, said second valve being responsive to an increase in oil pressure in said relief line to open to permit maximum oil flow therethrough and to permit restricted oil flow therethrough upon further increase in oil pressure; a plurality of oil ejecting nozzles adapted to cool the piston by oil jets emerging therefrom; and means providing fluid communication between said nozzles and pressure relief line intermediate said valves.

9. In an internal combustion engine having a plurality of pistons, the combination comprising, an engine-driven oil circulating pump; a supply line in fluid communication with the discharge side of said pump; a main oil gallery in fluid communication with various parts of the engine requiring lubrication; conduit means extending between and connected to said main oil gallery and supply line to provide fluid communication therebetween including an oil filter and a first oil cooler arranged in series; a pressure relief line extending between and connected to said supply line and the suction side of said pump to provide fluid communication therebetween; a first valve in said pressure relief line, said valve being biased to its closed condition, said valve being responsive to the oil pressure in said supply line to open when the oil pressure in said supply line reaches a predetermined magnitude; a second valve in said pressure relief line between said first valve and the suction side of said pump, said second valve including a valve body having a bore therein and passageway means between said bore and the suction side of said pump, said valve including a valve element movable axially within said bore to control the flow of oil through said passageway means, said valve element being biased to its closed position and being movable in response to the oil pressure in said relief line to a first open position wherein maximum oil flow through said passageway means is permitted and a second open position upon further increase in oil pressure in said relief line wherein oil flow through said passageway means is restricted; and a plurality of oil ejecting nozzles adapted to cool the pistons by oil jets emerging therefrom; and second conduit means extending between and connected to said nozzles and said pressure relief intermediate said valves to provide fluid communication between said pressure relief line and said nozzles.

10. In an internal combustion engine having a plurality of pistons, the combination comprising, an engine-driven oil circulating pump; a supply line in fluid communication with the pressure discharge side of said pump; a main oil gallery in fluid communication with various parts of the engine requiring lubrication; oil conditioning means including an oil filter and a first oil cooler arranged in series and connected to said main oil gallery and supply line to supply fluid communication therebetween; a pressure relief line extending between and connected to said supply line and the suction side of said pump to provide fluid communication therebetween; a second oil cooler in said pressure relief line; a plurality of oil ejecting nozzles adapted to cool the pistons by oil jets emerging therefrom; a first valve in said pressure relief line, said valve being biased to its closed condition, said valve being responsive to the oil pressure in said supply line to open when the oil pressure in said supply line reaches a predetermined magnitude; a second valve in said pressure relief line between said first valve and the suction side of said pump, said second valve being conditionable to prevent flow therethrough, to permit a maximum flow therethrough, and to permit a restricted flow therethrough, said valve being biased to the condition preventing flow therethrough and being responsive to the oil pressure in said relief line to permit a maximum flow therethrough when the oil pressure in said relief line reaches a first predetermined magnitude and permit a restricted flow therethrough when said oil pressure exceeds said first predetermined magnitude and reaches a second predetermined magnitude; and conduit means extending between and connected to said nozzles and said pressure relief line intermediate said second valve and said second oil cooler to provide fluid communication between said pressure relief line and said nozzles.

11. In an internal combustion engine, the combination comprising, an engine-driven oil circulating pump; a supply line in fluid communication with the pressure discharge side of said pump and the various parts of the engine requiring lubrication; a pressure relief line in fluid communication with said supply line and the suction side of said pump adapted to receive oil therein only upon the attainment of a predetermined pressure in said supply line; a valve in said pressure relief line, said valve being biased to its closed condition, said valve being responsive to the oil pressure in said pressure relief line to open when the oil pressure in said pressure relief line reaches a predetermined magnitude to permit flow of oil therethrough, said valve being responsive to a further increase in oil pressure in said pressure relief line to permit a restricted flow of oil therethrough; a plurality of oil ejecting nozzles adapted to cool the engine pistons by oil jets emerging therefrom; and means providing fluid communication between said nozzles and said pressure relief line in advance of said valve.

12. In an internal combustion engine substantially as set forth in claim 11, wherein said valve includes a valve body having a bore therein provided with an annular groove intermediate its ends and passageway means extending between said groove and the suction side of said pump, a cylindrical valve element slidable axially within said bore having a central recess extending from one end thereof to define an open end, a closed end and a tubular wall portion, said tubular wall portion having a first series of circumferentially spaced ports extending radially therethrough, said first series of ports being axially spaced from said closed end of said valve element a distance greater than the width of said groove, and a second series of circumferentially spaced ports extending radially through said tubular wall portion axially spaced between said first series of ports and said open end, said valve element being movable axially in said bore between a first position wherein an imperforated section of said tubular wall portion between said first series of ports and said closed end is in radial alignment with said annular groove a second position wherein said first series of ports is in radial alignment with said groove and a third position wherein said second series of ports is in radial alignment with said groove, stop means in said bore engageable with the open end of said valve element to establish said first position, spring means for urging said open end into engagement with said stop means, second spring means yieldably resisting movement of said valve element from its second position to its third position, the cross-sectional area of said first series of ports being considerably greater than the cross-sectional area of said second series of ports.

13. In an internal combustion engine substantially as set forth in claim 12, further including a plurality of oil ejecting nozzles, adapted to cool the pistons by oil jets emerging therefrom, each of said nozzles having an opening for ejecting oil therethrough, the total cross-sectional area of said nozzle openings being considerably less than the cross-sectional area of said first series of ports; and conduit means extending between and connected to said nozzles and said pressure relief line in advance of said valve to provide fluid communication between said pressure relief line and said nozzles.

References Cited in the file of this patent

UNITED STATES PATENTS

| | | |
|---|---|---|
| 1,073,197 | Westinghouse | Sept. 16, 1913 |
| 1,502,264 | Moore | July 22, 1924 |
| 2,788,773 | Meurer | Apr. 16, 1957 |
| 2,800,119 | Schmidl | July 23, 1957 |
| 2,801,006 | Hultgren et al. | July 30, 1957 |
| 2,893,514 | Badertscher et al. | July 7, 1959 |